(12) United States Patent
Norgaard et al.

(10) Patent No.: US 7,628,259 B2
(45) Date of Patent: Dec. 8, 2009

(54) FLUID FLOW REGULATION OF A VEHICLE SHOCK ABSORBER/DAMPER

(75) Inventors: Bret M. Norgaard, Poway, CA (US); Douglas J. Cimins, San Diego, CA (US)

(73) Assignee: Thyssenkrupp Bilstein of America, Inc., Poway, CA (US)

( * ) Notice: Subject to any disclaimer, the term of this patent is extended or adjusted under 35 U.S.C. 154(b) by 251 days.

(21) Appl. No.: 10/983,998

(22) Filed: Nov. 8, 2004

(65) Prior Publication Data

US 2007/0051573 A1    Mar. 8, 2007

(51) Int. Cl.
*F16F 9/34* (2006.01)
*F16F 9/14* (2006.01)

(52) U.S. Cl. .......... 188/322.13; 188/314; 188/282.15; 188/322.21; 188/322.14; 267/64.15

(58) Field of Classification Search ............ 188/322.13, 188/314, 282.15, 322.21, 322.14; 267/64.15
See application file for complete search history.

(56) References Cited

U.S. PATENT DOCUMENTS

| | | | | |
|---|---|---|---|---|
| 4,645,043 A * | 2/1987 | Imaizumi | ............... | 188/282.4 |
| 4,936,424 A * | 6/1990 | Costa | ............... | 188/314 |
| 5,413,195 A * | 5/1995 | Murakami | ............... | 188/282.6 |
| 5,810,128 A * | 9/1998 | Eriksson et al. | ............... | 188/289 |
| 6,213,263 B1 * | 4/2001 | De Frenne | ............... | 188/318 |
| 6,422,361 B2 * | 7/2002 | Naples et al. | ............... | 188/322.15 |
| 6,446,771 B1 * | 9/2002 | Sintorn et al. | ............... | 188/288 |
| 6,604,751 B2 * | 8/2003 | Fox | ............... | 280/276 |
| 6,722,678 B2 * | 4/2004 | McAndrews | ............... | 280/285 |
| 6,880,684 B1 * | 4/2005 | Evans et al. | ............... | 188/319.2 |
| 2001/0009214 A1 * | 7/2001 | Tanaka | ............... | 188/275 |
| 2002/0117366 A1 * | 8/2002 | Casellas et al. | ............... | 188/322.15 |

OTHER PUBLICATIONS

Dusty Times Advetisement "Bilstein Shock Absorbers", Oct. 2004.*
ThyssenKrupp Bilstein of America Advertisement, Score Prim in Nevada race program, Sep. 10, 2004.*
ThyssenKrupp Bilstein of America, PowerPoint Attachment, May 17, 2004.*
Thyssen Krupp Bielstein of America "Base Valve Mono Tube Motosport Shocks".

* cited by examiner

*Primary Examiner*—Robert A Siconolfi
*Assistant Examiner*—Mahbubur Rashid

(57) ABSTRACT

Shock absorber components, such as a radial bypass damper, an anti-cavitation valve (ACV) and an incremental flow metering valve IFMV. The damper is of a continuous, unitary construction with a main hole and auxiliary holes interconnected by passageways. The ACV has openings that angle obliquely relative to entry surfaces of valving shims and extend at an incline continuously through the valving shims. The metering valve linearly regulates flow, substantially independent of piston displacement.

16 Claims, 17 Drawing Sheets

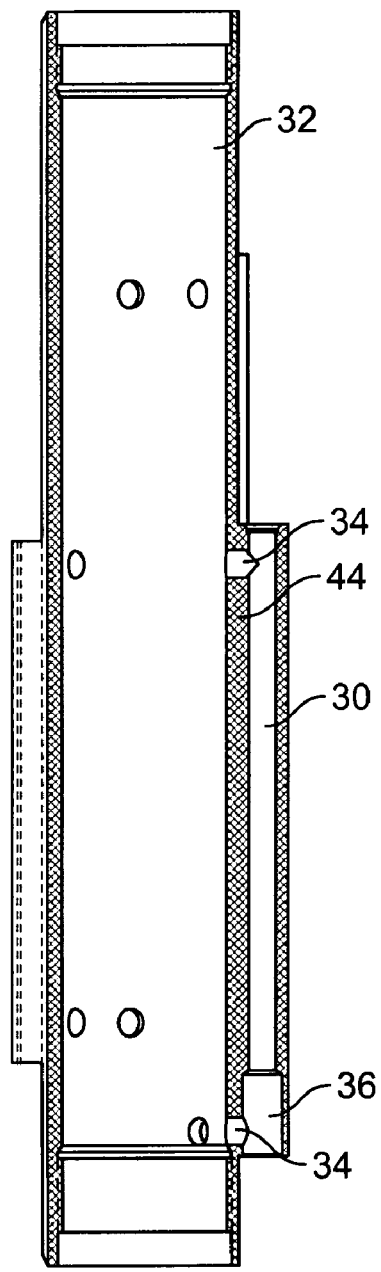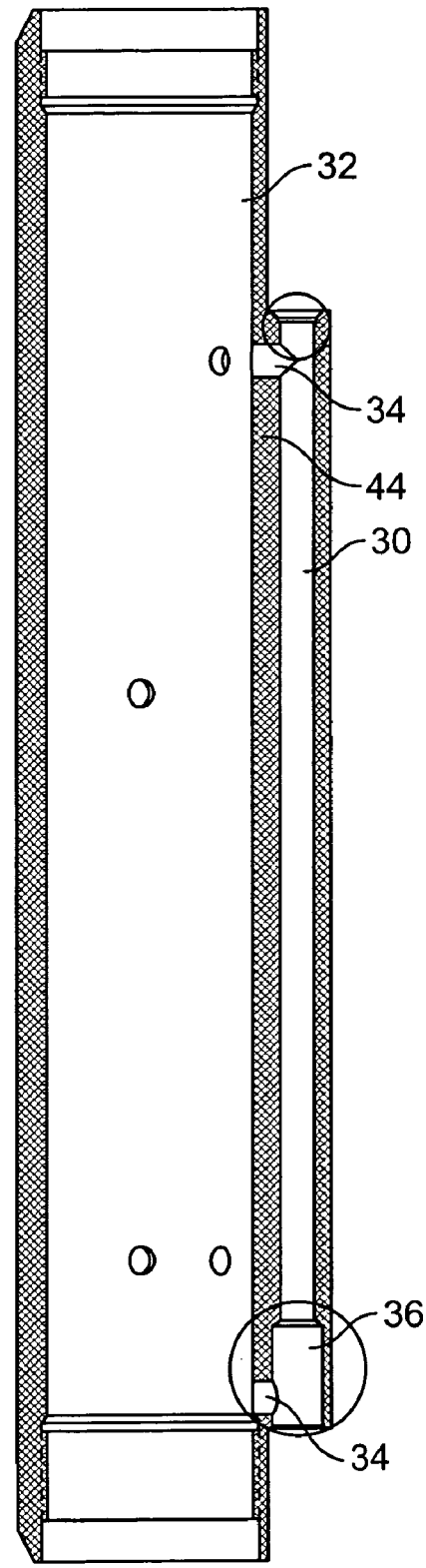
FIG. 9  FIG. 10

FLUID FLOW REGULATION OF A VEHICLE SHOCK ABSORBER/DAMPER

BACKGROUND OF THE INVENTION

The present invention relates to position sensitive radial bypass damper (RBD) components that regulate gas/oil flow of an off road vehicle shock absorber. Such components may include a radial bypass damper housing, an anti-cavitation valve (ACV), and an incremental flow metering valve (IFMV).

Vehicle suspension undergoes dynamic movements as it negotiates obstacles generally found in off-road racing venues. Shocks are provided to control wheel movement by resistance in off-road vehicles with such suspension. Such resistance arises from pressure forming on the compression side of the working piston during the compression stroke and on the rebound side of the piston during the rebound stroke. The nitrogen chamber, separated from the hydraulic oil by a floating dividing piston, provides an opposing force on the said oil during the dynamic functions of the damper. Oil displacement and directional forces compress and expand the nitrogen chamber but can induce cavitation of the oil within the damper itself if the transient response of the dividing piston from positive force to negative force is delayed (hysteresis).

The radial bypass damper of a vehicle shock absorber uses hydraulic oil transfer to deflect valving shims that are located on both sides of the working piston. Foaming of the hydraulic oil, or cavitation, is inherent to the dynamics inside the radial bypass damper, but may be avoided with a nitrogen gas chamber of the reservoir. The life of the radial bypass damper is dependent on the longevity of the seals, wear bands, and the hydraulic oil itself. Preventing the damper from overheating is critical to avoid the break down of the hydraulic fluid and seals from excessive heat buildup caused by energy dissipation of the damper. However, conventional steel housings that typically have smooth tubing do not optimize their surface area for cooling and therefore the air flow past the damper is not utilized as well for dissipating the extreme heat generated from damping an off road vehicle's suspension movements.

It would be desirable to provide components for an off road vehicle shock absorber that are suited to promote improved thermal management, weight savings, adjustability, durability, and adaptability to changing conditions.

BRIEF SUMMARY OF THE INVENTION

One aspect of the invention is to provide a radial bypass damper useful in providing a shock absorption function that achieves a substantial reduction (1) in heat build up due to the use of a finned aluminum alloy housing, (2) in weight by as much as 25% over a conventional steel housing because of the aluminum alloy construction, and (3) in adverse wear characteristics on piston wear bands from distortions in the housing that arise due to welding external bypass tubes onto the housing. Such welding is avoided with the invention.

Such a radial bypass damper comprises an elongated housing with a main hole; at least one auxiliary hole spaced from the main hole, the main hole and the at least one auxiliary hole being elongated in a direction of elongation of the housing and being free from intersecting each other, the housing having an intervening housing material that is continuous and unbroken and arranged to space the main hole from the at least one auxiliary hole, the housing having an intersecting passageway extending between the main hole and the at least one auxiliary hole and not beyond the at least one auxiliary hole.

Another aspect of the invention resides in valving shims in the working piston and in an ACV that have continuous, inclined passages for hydraulic oil flow to prevent cavitation during sudden changes of directional travel of the working piston and to maintain positive pressure at the working piston. The ACV with such valving shims permits lower nitrogen gas pressure to prevent cavitation of the oil over that of conventional shock absorbers not equipped with a like ACV, yet reduces pressure generated at its piston rod. This effectively improves the performance of the shock absorber and increases positive feed back to the driver by reducing the harshness incurred by sharp increases in force when the shock absorber compresses over rough surfaces.

A further aspect resides in an IFMV that permits adjustments to the bypass of fluid at different points of up and down travel. Accurate adjustment is available without the need to visually see the index points, because of a detent ball assembly providing an audible "click" and feel at each setting.

Such an IFMV, comprises a valve housing having a passage for fluid flow through the valve housing, a piston configured to move in response to application of fluid forces toward and away from a position that closes the passage; and a flow regulating mechanism including a regulator arranged to regulate flow of fluid through the passage, the flow regulating mechanism including a plurality of selectable settings that are accessible from outside the valve housing and including a regulator movable to vary a dimension of at least a portion of the passage in accordance with a selected one of the selectable settings so as to provide a substantially linear variation in the flow of fluid through the passage as the regulator moves to a position corresponding to the selected one of the selectable settings, the flow regulating mechanism providing regulation of the flow of fluid through the passage substantially independent of movement of the piston as long as the piston is away from a position that closes the passage.

BRIEF DESCRIPTION OF THE DRAWINGS

For a better understanding of the present invention, reference is made to the following description and accompanying drawings, while the scope of the invention is set forth in the appended claims.

FIGS. 7-10 are longitudinal cross sections of the radial damper housing of FIG. 2 across the main hole and respective ones of the auxiliary holes.

DETAILED DESCRIPTION OF THE INVENTION

Figure 1:
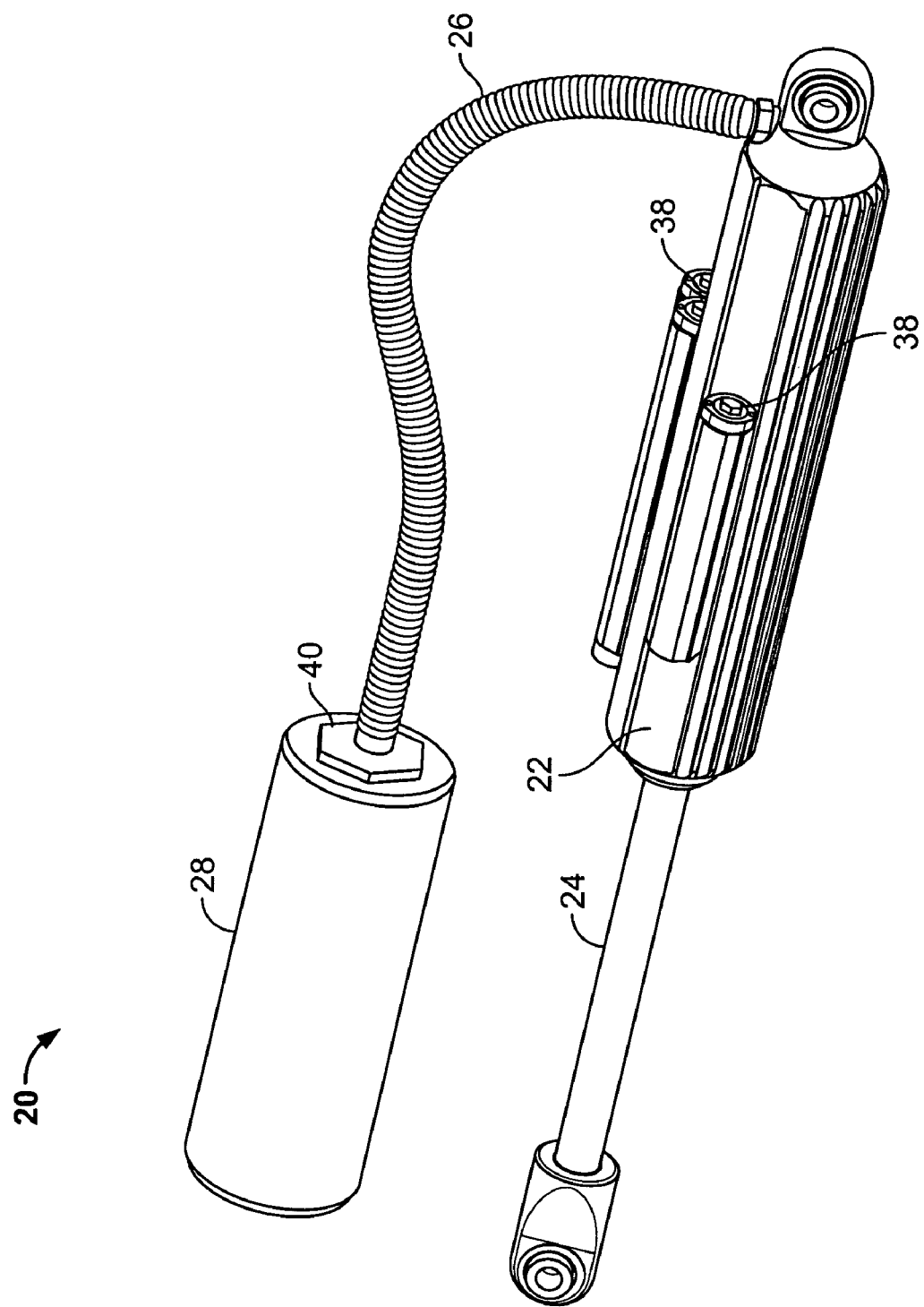
FIG. 1 is an isometric view of the shock absorber in accordance with the invention.

Off-road racing vehicles include those in a truck-race, buggy-race, lifted truck recreational, sand car-recreational, monster truck and military specialty vehicles. The function of the shock absorber 20 (FIG. 1) of the invention is to permit such off road racing vehicles to pass over extremely rough terrain at high speeds with improved control and stability.

The shock absorber 20 includes a radial bypass damper housing 22 having a chamber in which moves a working piston and shaft 24 to effect compression and rebound strokes. A hose 26 connects the opposite end of the chamber with an oil gas reservoir 28.

Figure 2:
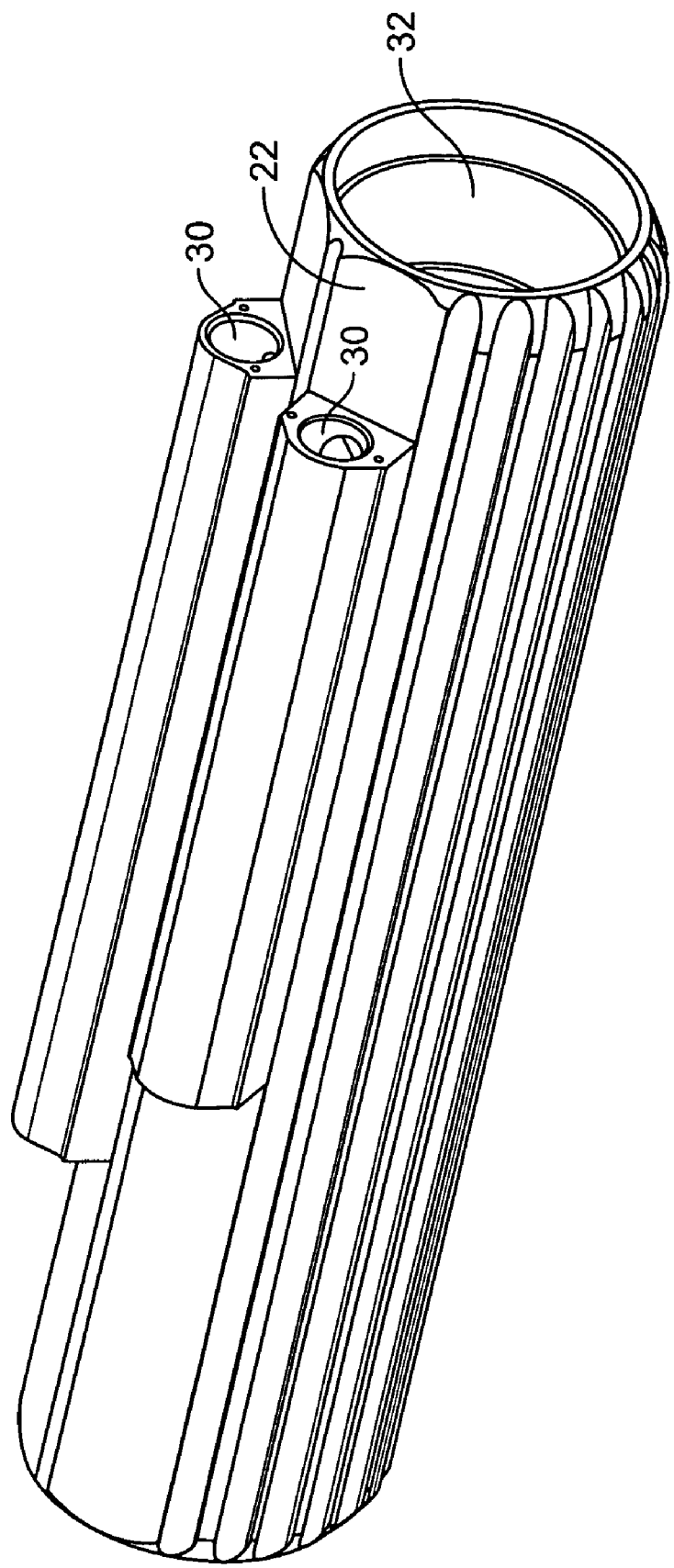
FIG. 2 is an isometric view of the radial damper housing of the shock absorber of FIG. 1.

Turning to FIG. 2, the radial bypass damper housing 22 is made of aluminum alloy and formed without welds. The housing of the radial bypass damper housing 22 may be formed from extruded 6061-T6 aluminum alloy that is manufactured in solid profile in fixed lengths. The profile of the radial bypass damper housing 22 incorporates cooling fins, which in turn offer substantially more surface area and material to disperse the heat during operation and direct airflow than smooth, un-finned surfaces.

When the invention was tested in operation, temperature indicators showed that the operating temperatures that are experienced are lower than when steel dampers are used. Also, higher vehicle speeds were attained than for other damper types installed on test vehicles on the same course. Inspection of components that are susceptible to wear showed improvement in reduced wear and reduced failure in long-term service over conventional dampers tested. Such performance gains signify the realization of serviceability and cost savings in operation during the life of the damper.

The fixed lengths are cut to suit installation for an off-road vehicle. The different lengths for longitudinal auxiliary holes (bypass passageways) 30 are cut to the appropriate dimensions. The longitudinal auxiliary holes 30 are machined into the solid parts by a gun-drilling procedure. The main hole (cylinder) 32 is precision bored.

Figure 3:
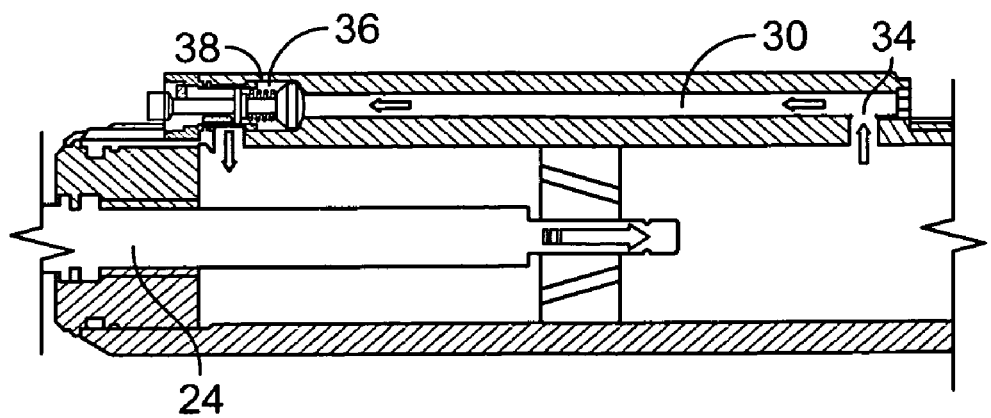
FIG. 3 is a schematic representation of the compression stroke of the working piston within the radial bypass damper, showing the relative flow within the correlating bypass.
Figure 4:
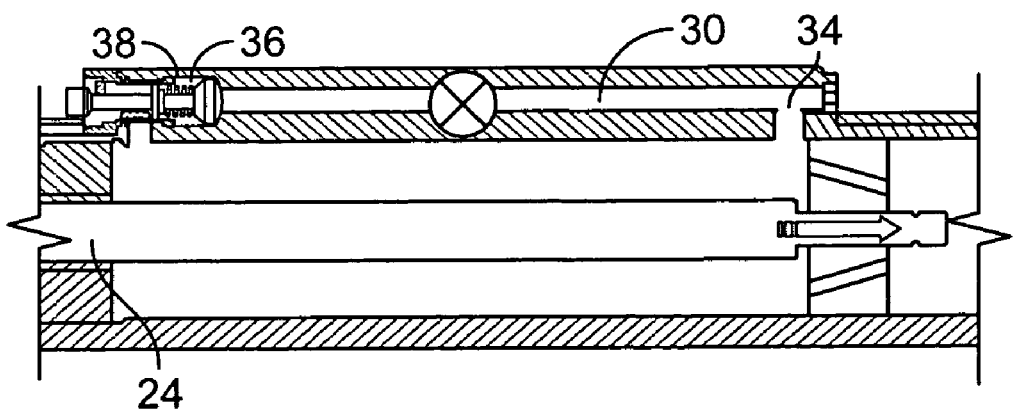
FIG. 4 is a schematic representation of the compression stroke of the working piston within the radial bypass damper, showing the point at which the bypass function is no longer actuated.
Figure 5:
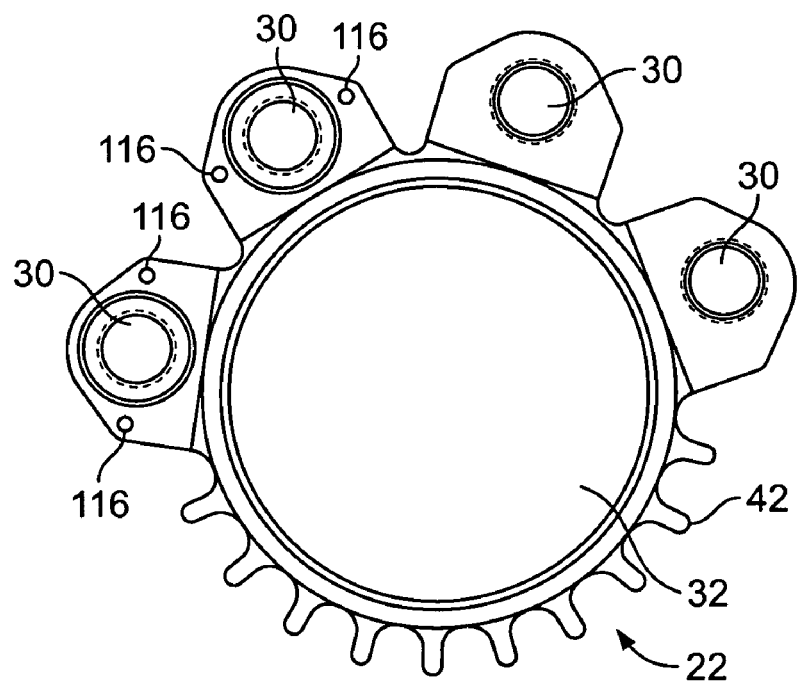
FIG. 5 is an end view of the radial damper housing of FIG. 3.
Figure 6:
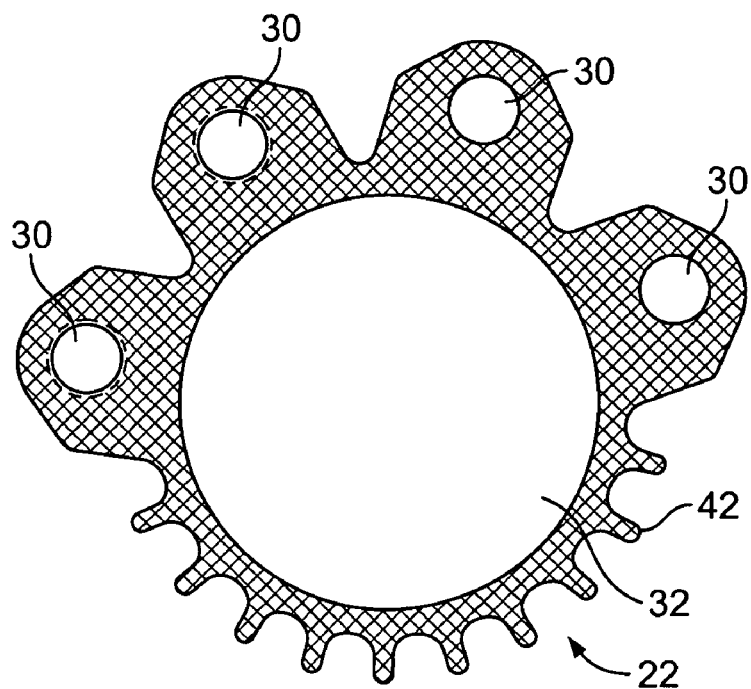
FIG. 6 is a transverse cross section midway along the radial damper housing of FIG. 3.
Figure 7:
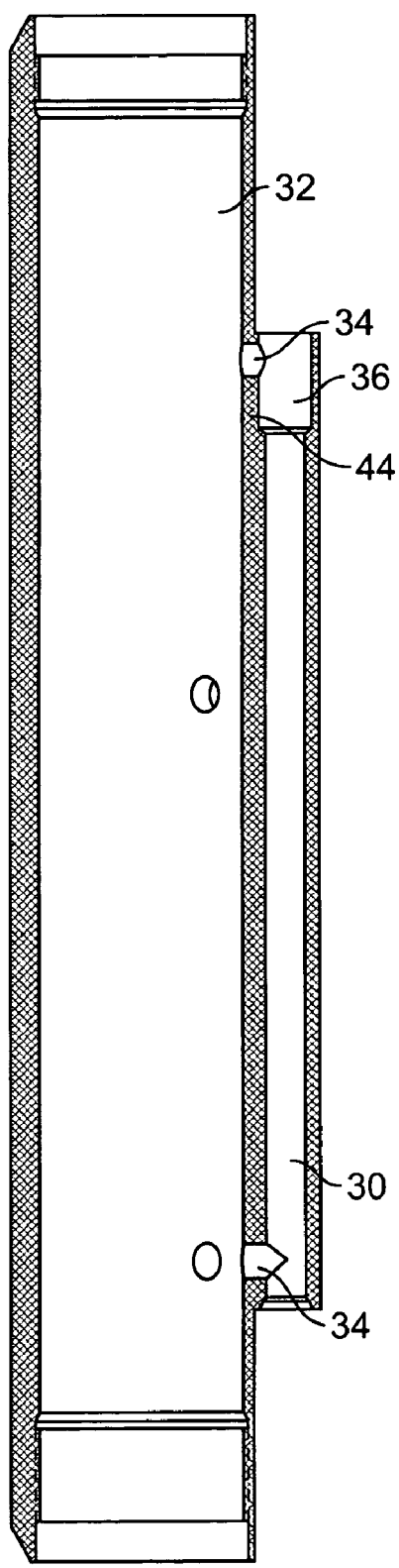
Figure 8:
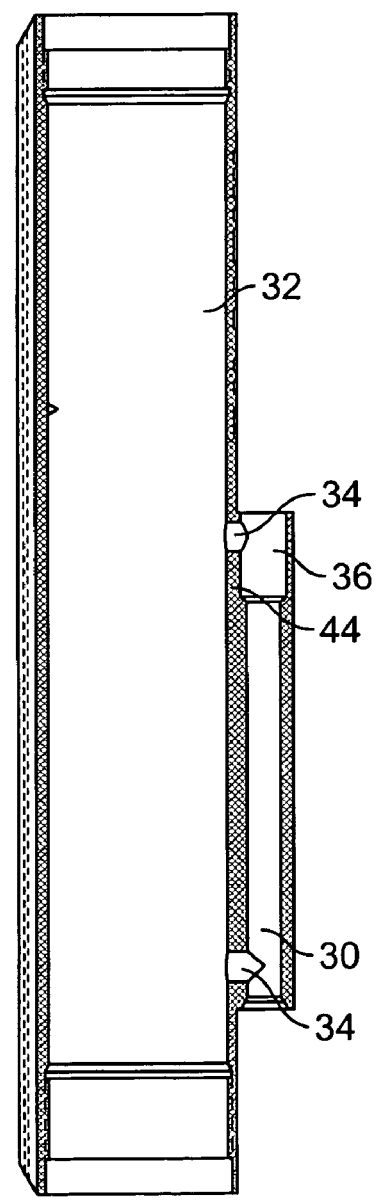

FIGS. 3 and 4 show respectively the compression strokes of the working piston 24 within the main hole 32 of the radial bypass damper housing 22. As best seen in FIGS. 5-10, there are two longitudinal auxiliary holes (bypass passageways) 30 that allow the oil to bypass through the two longitudinal auxiliary holes depending upon the position of the working piston during the compression stroke with respect to the intersecting ports 34. There is no bypass function performed by these two longitudinal auxiliary holes (bypass passageways) 30 during the rebound stroke. However, there are two other longitudinal auxiliary holes (bypass passageways) that provide bypass function during the rebound stroke depending upon the position of the working piston 24 during the rebound stroke with respect to the intersecting ports 34. The longitudinal auxiliary holes 30 widen into a cavity 36 at an end and into which is to be inserted an IFMV.

As the working piston 24 travels towards the open intersecting ports 34, the oil flows in the opposite direction, deflecting the piston of the IFMV 38. The oil then flows through the IFMV 38 at a preset position and to the backside of the working piston 24. This is the bypass function of the radial bypass damper housing 22 during the compression stroke. The location of the open intersecting ports varies and is reliant on the total stroke length of the working piston 24 within the radial bypass damper housing 22.

When the working piston 24 covers the open intersecting bypass port 34, the bypass function becomes disengaged entirely. This is also true as the working piston 24 travels beyond the bypass port 34. This same dynamic function is observed during the rebound stroke of the working piston 24 with the incremental metering flow valve 38 located at the opposite end of the bypass port, thereby governing the flow in the opposite direction from what is viewed in FIG. 4.

During the rebound stroke, the incremental metering flow valve 38 sees equal pressure on both sides of its piston and will remain closed, or inactive. When the working piston 24 is beyond the bypass ports in its compression stroke, the valving found in the working piston 24 and the ACV 40 is governing flow/resistance in its entirety, thus no additional bypass is in use.

The radial bypass damper housing 22 of the invention preferably has no welds and the longitudinal auxiliary holes 30 and main hole 32 are manufactured precisely straight and true to provide longer wear band service life, less frictional resistance and reduced heat build up as compared to having external bypass tubes welded onto the housing. Such welding gives rise to unwanted distortions that create adverse wear characteristics on piston wear bands. After machining, the housing of the damper is preferably hard anodized to specification MIL-A-8625F Class 1, type III for corrosion and wear resistance.

The radial bypass damper housing 22 acts as a heat sink. It dissipates the heat built up from damping energy by transferring it outward through the surface area of the profile provided by the cooling fins 42 and external profile. Analogous to a radiator, airflow over the damper housing improves the cooling performance and stabilizes the temperature at a lower level for the duration of a race with the off-road vehicle. The rate of cooling has been tested and found to reduce peak temperatures by as much as 100 degrees F., which constitutes as much as a 33% reduction in temperature. Steel shock tubes under the same test conditions often reach peak temperatures of 325 degrees F. and above.

Figure 11:
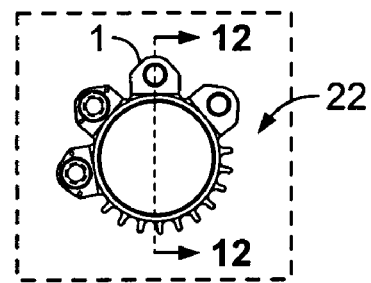
FIGS. 11 is an end view as in FIG. 5, but marked with notation for indicating the manufacturing procedure.
Figure 12:
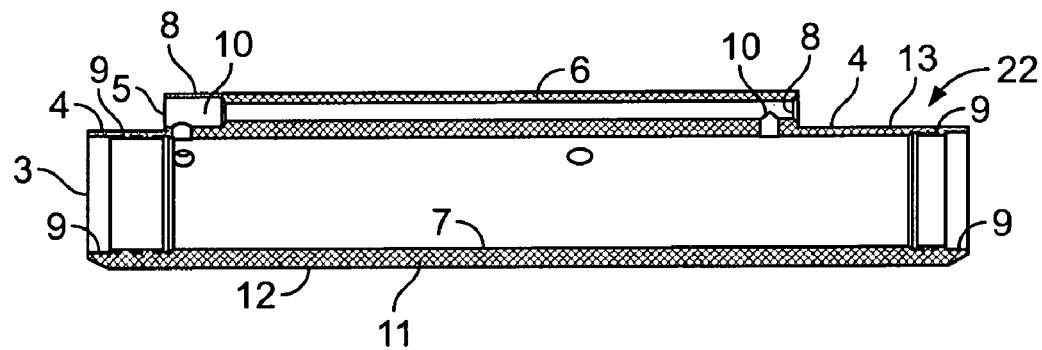
FIG. 12 is a longitudinal view taken across 12-12 of FIG. 11 and marked with notation for indicating the manufacturing procedure.

FIGS. 11 and 12 illustrate the steps in the manufacturing procedure for the radial bypass damper housing 22. An aluminum alloy extrusion process is used, the steps of which are conventional for extruding aluminum alloy housings, albeit unique as it applied to the damper housing of the invention. A tool-die is made with the parts cross-sectional profile machined in its center. The outer features of the damper housing are incorporated in to the tool-die. The die is placed in a conventional extrusion apparatus and semi-molten aluminum alloy is forced through the die at high pressure and cooled upon exit to maintain the shape with minimal distortion over a 12' length. The steps of manufacture are: 1. Initially solid profile of aluminum alloy is extruded, such as in 12 foot lengths. 2. The solid profile is cut to desired lengths, e.g., four different lengths. 3. The Main hole (cylinder) is located, e.g., 3 inch diameter. 4. Radial bypass bosses are milled to length. 5. The longitudinal auxiliary hole centers are located. 6. The longitudinal auxiliary holes are gun drilled. 7. The main hole is precision bored and honed to specification. 8. Bypass counter bores and threading is made. 9. Main hole counter bores and threading is made. 10. Intersecting bypass ports are drilled. 11. Surface finish and cleanup are performed. 12. Hard anodized clear, MIL-A-86256, Class 1-Type III is conducted. 13. Logo is milled onto housing.

Figure 13:
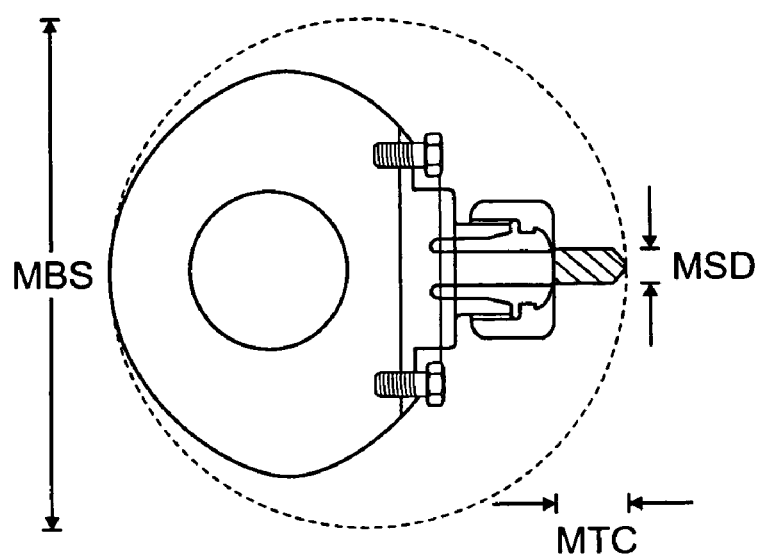
FIG. 13 is a schematic representation of a drilling procedure to form an interconnecting passageway in between main and auxiliary holes of the radial damper of FIG. 2.
Figure 14:
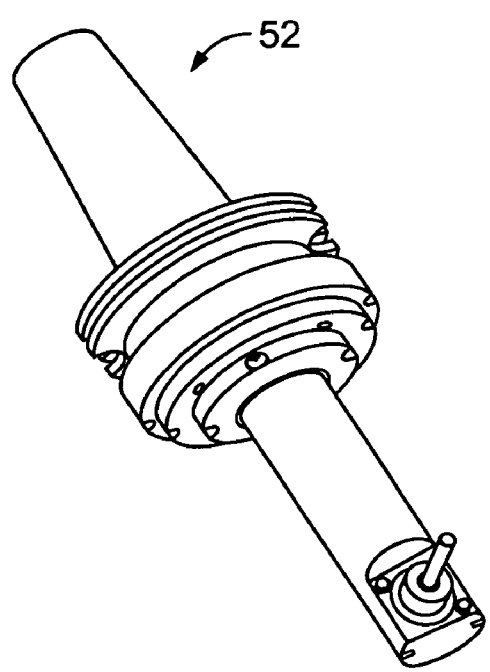
FIG. 14 is an isometric view of a drilling tool used in the drilling procedure of FIG. 13.

A drilling process (FIG. 13) is performed from the inside of the radial bypass damper housing 22 outward through intervening walls 44 (FIGS. 7-10). FIG. 13 indicates the minimum bore size (MBS), the maximum shank diameter (MSD) and the maximum tool clearance (MTC). An appropriate drilling tool 52 (FIG. 14) is used to perform a drilling process for forming intersecting ports 34 between the main hole 32 and respective ones of the longitudinal auxiliary holes 30. This drilling process is not from the outside inward through the exterior of the longitudinal auxiliary holes and thus eliminates the need for external plugs and potential seal failures that otherwise are present conventionally with steel tubes where the exterior of the longitudinal auxiliary holes are drilled into from the outside. Counter bores are made at the ends of the auxiliary holes and main hole to accommodate the insertion of further components, such as IFMVs.

Figure 15:
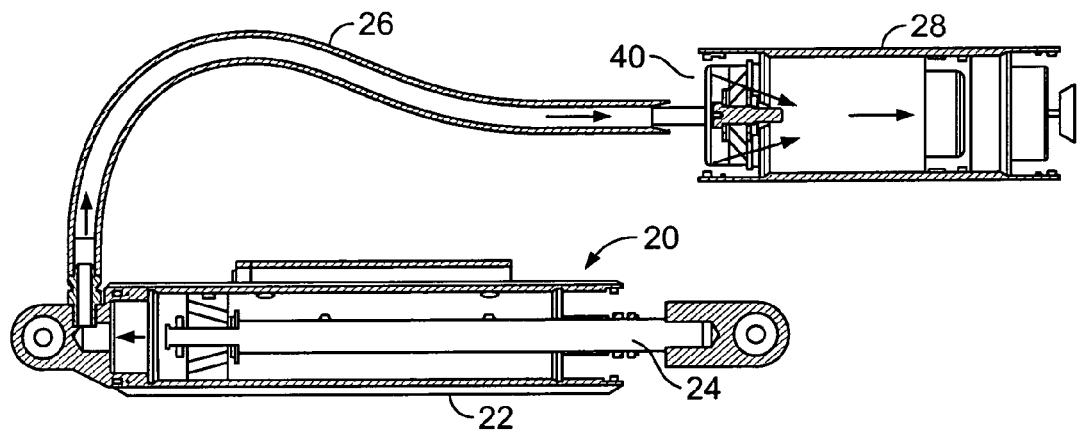
FIG. 15 is a schematic representation of the shock absorber of FIG. 1 showing the flow direction during the compression (bump) stroke of the working piston, between the working piston, the hose and the ACV.
Figure 16:
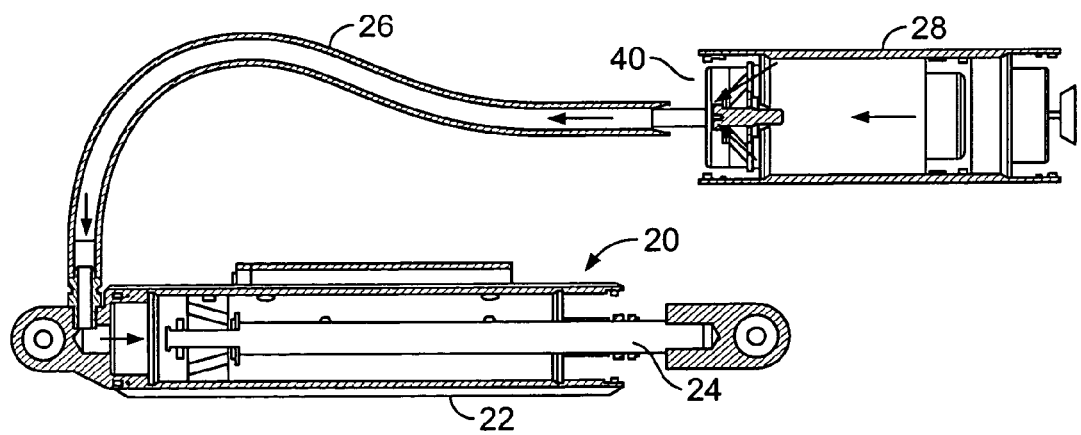
FIG. 16 is a schematic representation of the shock absorber of FIG. 1 showing the flow directions during the extension (rebound) stroke of the working piston, between the working piston, the hose and the ACV.
Figure 24:
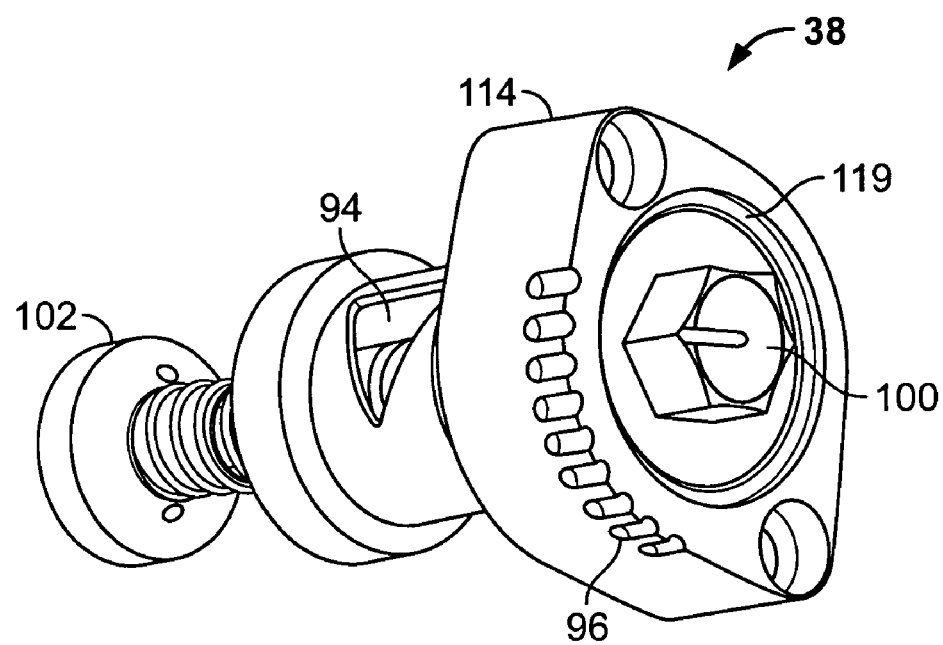
FIG. 24 is an isometric view of the IFMV of FIG. 23.

Turning to FIGS. 15 and 16, compression and rebound strokes of the working piston 24 and their effect on flow through valving shims of the ACV 40 (FIG. 17) are depicted. Deflective disks (or valving shims) (FIGS. 17, 18) that form a valve stack are used to tune the amount of flow/resistance in both compression and rebound strokes of a mono-tube damper. The shims are found primarily on the active/working piston 24 within the damper housing 22 (FIG. 24), but may also be used in conjunction with a base valve/ACV (FIG. 15, 17). The greatest diameter shim found directly on the surface of the piston/base valve is called a cover disc and jointly acts as a check valve, governing oil flow in the opposite direction during the rebound or compression stroke of the damper.

Figure 17:
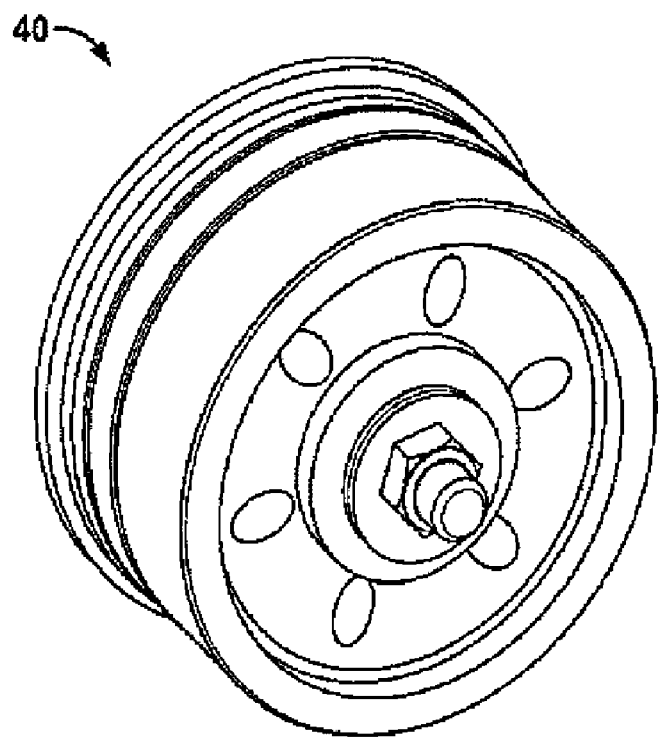
FIG. 17 is an isometric view of the ACV assembly installed in the reservoir end cap.
Figure 18:
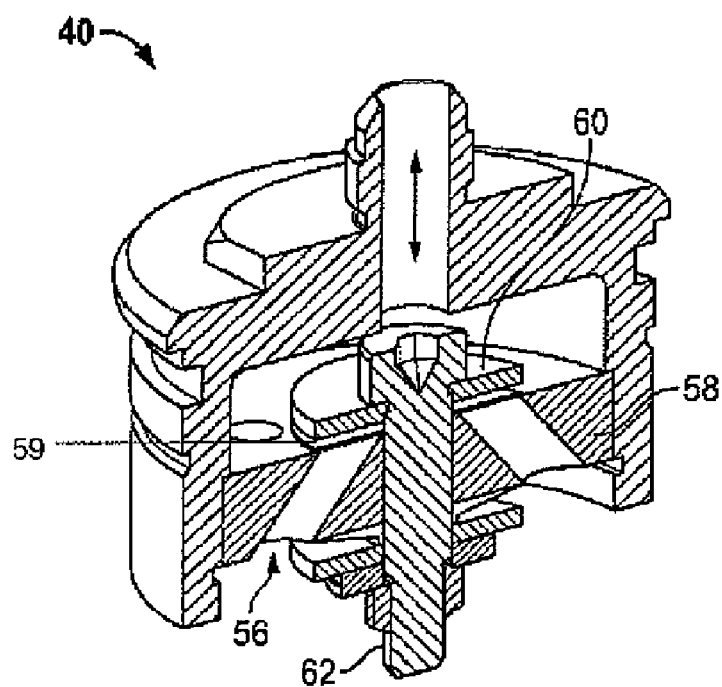
FIG. 18 is an isometric cutaway view midway across the ACV of FIG. 17.

Referring to FIGS. 17 and 18, the ACV 40 is a tuning tool that permits far less gas pressure to achieve the task of preventing oil cavitation (foaming). An ACV 40 is more commonly associated with twin-tube shock design because it is fixed toward the base of the internal shock tube and generally is without a gas chamber. In mono-tube shock design, the location is much the same but with the option of moving it into a remote reservoir with the gas chamber and dividing piston.

The ACV 40 is stationary and located in the reservoir end cap between the floating piston, which separates a nitrogen gas chamber from the oil, and the working piston. Its function is not affected by either of the aforementioned locations. The base valve 40 enhances the effects of a damper's nitrogen chamber. The nitrogen gas chamber provides a reactive force on the hydraulic oil, and prevents cavitation of the oil. This is an inherent byproduct of flowing fluid past solid objects at high velocity, i.e. the working piston and valve shims. Cavitation is the sudden formation and collapse of low-pressure bubbles in liquids by means of mechanical forces, such as those resulting from propeller rotation.

The dividing piston will move relative to oil displacement caused by the piston rod plunging in or out of the damper, while maintaining force on the oil due to the nitrogen chambers ability to compress and expand. The side effect is that the gas pressure rises significantly as the chamber is reduced in size. This creates force on the piston rod effectively adding "spring rate". In other words, the gas force wants to push the piston rod back out of the damper. This force is like a spring on a vehicle and can increase the resistance put upon the vehicles "sprung weight" and change the dynamics of the vehicles handling and feel. A sudden ramp-up of gas force when the piston rod displaces the oil can make a vehicle feel very harsh over rough terrain, effectively losing traction and "detaching" the driver from feedback through vehicle.

The ACV 40 is tuned to maintain pressure between the working piston and reservoir when the shock is in transition from compression to rebound strokes. It works with the nitrogen chamber to reduce the chance of cavitation during sudden changes of directional travel of the piston but with upwards of 175% less psi. Without the ACV 40, the gas pressure must be set to 200-250 psi static to help the piston respond quickly to the rebound stroke. However, the inherent lag in transient response, or hysteresis, can cause an air pocket to form at the head of the working piston. Hysteresis is the lagging of a physical effect on a body behind its cause (as behind changed forces and conditions).

When the working piston 24 goes into its rebound stroke, the dividing piston must respond by changing direction as well. In other words, the gas pressure expands when the force changes from compression to extension. This is the dynamic point of action that can induce cavitation at the working piston. Without a quick response, an air pocket can form in the main damper cylinder, directly affecting the performance of the damper throughout the duration of a race or hard use. This air pocket is found in between the hose inlet and the working piston. With each stroke, the air pocket would continue to disperse to both sides of the working piston and bypass ports, causing what is called "fade". The working piston 24 will lose its ability to generate the needed resistance to the dynamic motions of the vehicle and its suspension, allowing the tires to lose contact or allow the vehicle to bottom out it's suspension travel.

The ACV 40 is fixed in place by an internal retaining ring and permits easy servicing and tuning. The remote reservoir housing contains the gas chamber, which is separated from the hydraulic oil with a floating dividing piston. The ACV 40 reduces the required gas pressure by as much as 130-175% as compared to conventional products. As in the working piston 24 of the shock absorber, the ACV 40 uses valving shims to govern the flow of oil and maintain positive pressure at the working piston. Charge pressures are reduced from as much as 250 psi to a minimum of 50 psi, effectively reducing the gas spring force on the piston rod and therefore reducing measurable spring rate. The rod force of a shock absorber not equipped with the ACV 40, charged to 200 psi, was measured at 338.32 lbf (1504.83 N) when compressed. The rod force of the same shock absorber equipped with the ACV 40 and charged to 60 psi was measured at 101.49 lbf (451.45 N). No performance lag (indicating cavitation) was observed when tested on a dynamometer.

Figure 19:
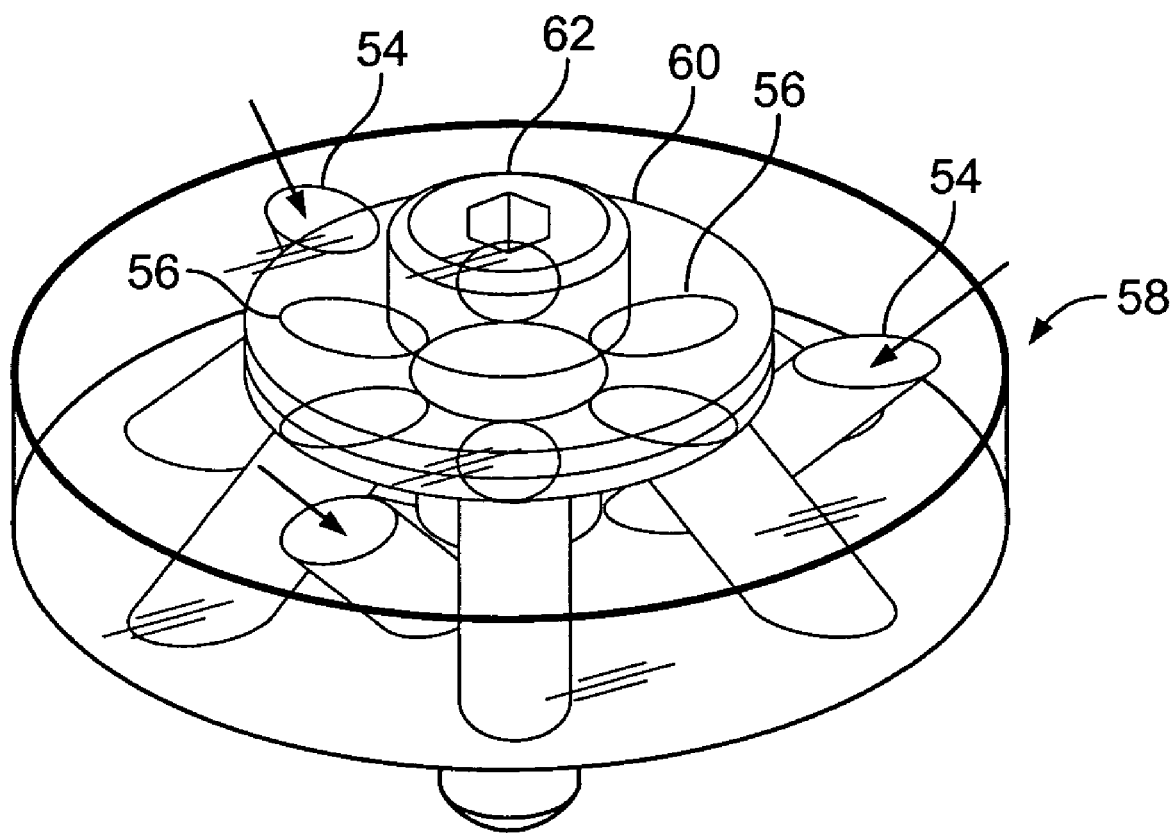
FIG. 19 is an isometric view of the rebound face of the ACV and washer of the valving shims of FIG. 17.

Turning to FIG. 19, an anti-cavitation valve body 58 has three compression ports 54 that are angled into a tuned valve stack, which is located on opposite side, as viewed. The anti-cavitation valve body 58 has six rebound ports 56 that allow the reverse flow through the ACV 40 to occur, only having to actuate a single lightly rated deflective shim. This anti-cavitation valve body 58 acts as a directional valve with minimal resistance to the flow of oil on rebound. Referring now also to FIG. 18, the ACV 40 uses valving shims to govern the flow of oil and maintain positive pressure at the working piston. The valving shims include a plurality of stacked plates of different dimensions stacked in succession from a cover plate 59 and sharing a common axis with the cover plate 59. A second cover plate is not depicted in FIG. 18. The heavy washer 60 is shimmed a particular distance away from the cover plate 59 and acts as a stop plate. A fastener 62 through the center of the valving shims keeps the valving shim assembly together. Only the required amount of deflection to allow maximum flow is needed and limiting the cover shim at that point reduces cycle fatigue.

Opposite from that of the working piston, the greater number of ports in the ACV 40 are utilized for the rebound stroke, and the lesser for compression. The ACV 40 must permit the dividing piston to react as quickly as possible during its rebound travel and therefore rebound force must be relieved effectively. In contrast, the compression ports of the ACV 40 are fewer and are restricted with a tuned valving stack, much like the working piston within the radial bypass damper. The intent being to prolong a built up force under compression stroke between the working piston and the ACV 40.

Conventionally bypass dampers that are position sensitive include variable flow metering check valve assemblies. The off-road industry has used several variations of bullet style check valve pistons with contoured valve seat that are adjusted by a threaded stop-pin that limits the distance the piston can travel. The amount of flow is governed at this piston and its mating/sealing surface.

Figure 20:
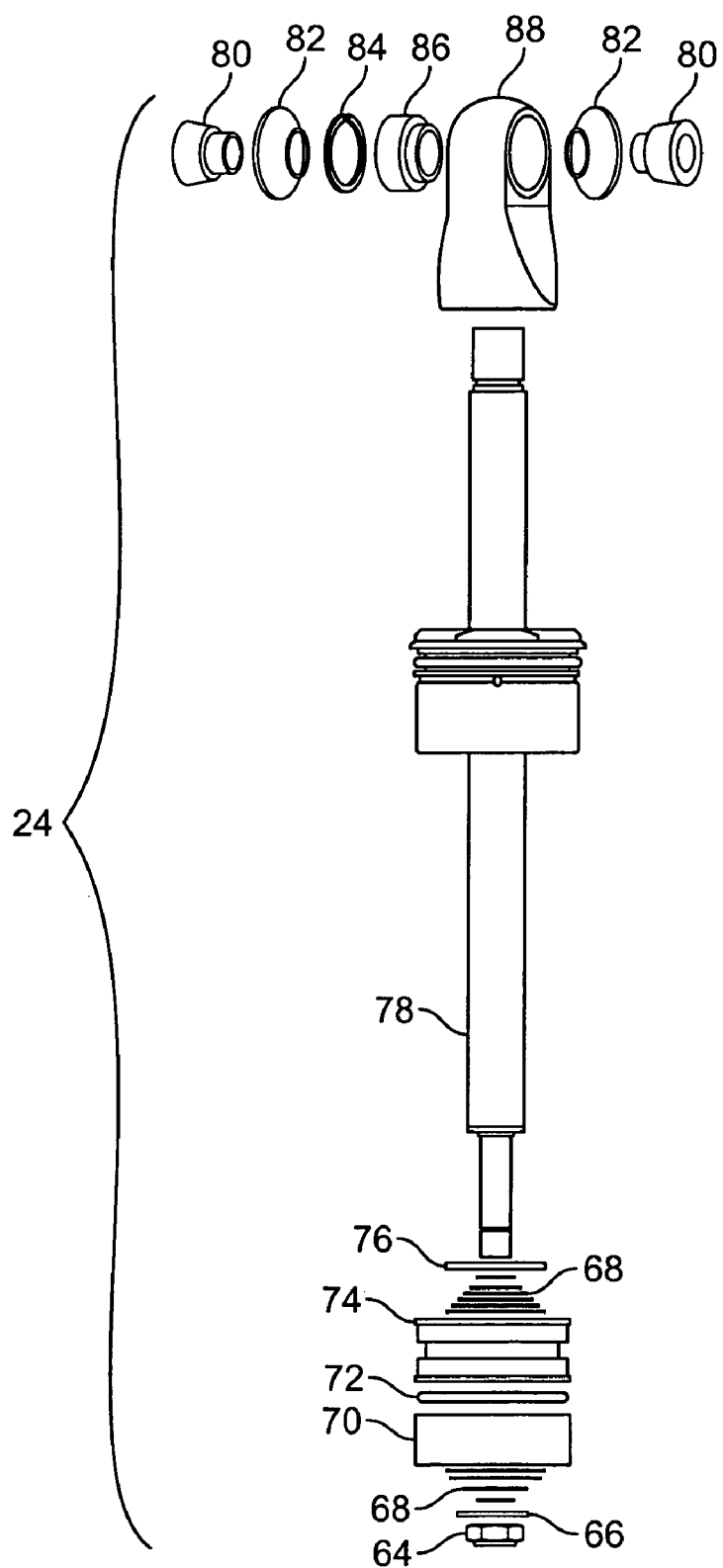
FIG. 20 is an exploded view of the components of the working piston including valving shims.
Figure 21:
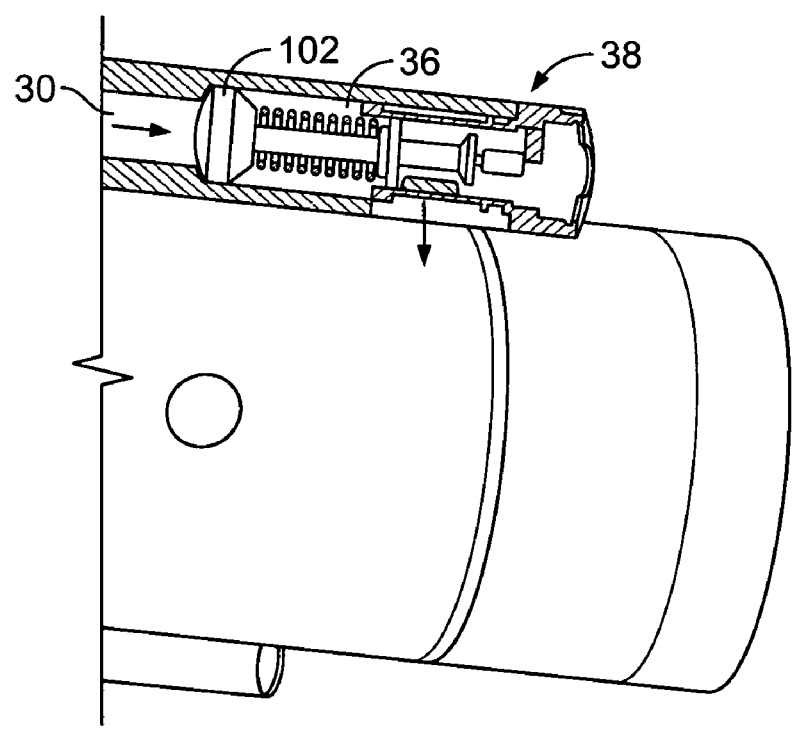
FIG. 21 is a schematic representation of flow direction through the IFMV in place in an auxiliary hole of the radial damper housing.

FIG. 20 shows some exemplary components of the working piston 24, such as a nut 64, washer 66, valving shims 68, wear band 70, O-ring 72, piston 74, washer 76, piston rod 78, bearing spacer 80, bearing cup seal 82, internal retaining ring 84, spherical bearing 86 and rod end 88. The valving shims 68 may include the cover plate 59 of FIGS. 18-19, except arranged in a reverse orientation in that more flow is needed during the compression stroke for regulation but flow may be restricted during the rebound stroke.

Figure 22:
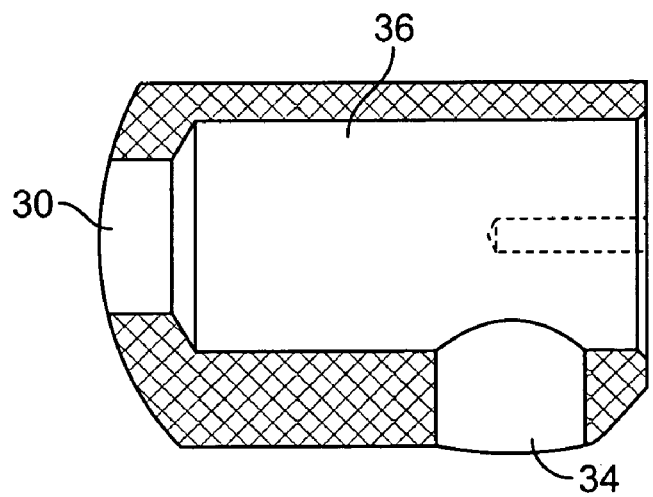
FIG. 22 is a cross-section of a portion of an auxiliary hole of the radial damper housing into which is to be fitted the IFMV.
Figure 23:
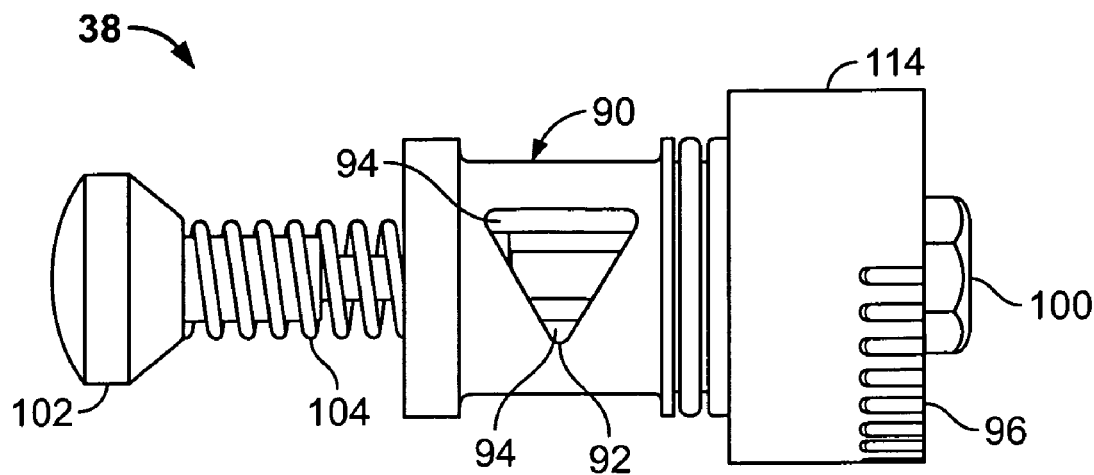
FIG. 23 is a side view of the IFMV that is represented schematically in FIG. 21.

Turning to FIGS. 21, 23-26, the present invention encompasses an IFMV 38 for whose piston travel is not limited until maximum flow through the valve occurs. That is, its piston does not limit the regulation of flow at all. Instead, a flow regulating mechanism 90 is provided that includes a triangular port assembly located at one end of the bypass port to govern the flow bypass adjustments. The IFMV 38 is positioned within the cavity 36 (FIG. 22) at an end of each of the longitudinal auxiliary holes 30.

The triangular port assembly includes an opening 92 that is shaped like an isosceles triangle to allow for precise monitoring of the bypass. Two opposed triangular ports are machined into the valve housing, position diametrically across from each other. The flow regulating mechanism includes a flow regulator 94 that is rectangular in shape to sweep past the triangular shaped ports to create a linear change in the rate of flow, i.e. increase or decrease as applicable depending upon the unobstructed dimension through the triangular ports.

The actuation of the IFMV 38 is adjusted externally and has sure-indexing features 96. The valve is a one-piece unit sealed with Buna O-rings that prevent oil from escaping and prevent dirt and water from entering. A spring-loaded detent ball 98 is arranged to provide and audible click and feel as it is moved along each of the selectable settings. The valve cannot be rotated beyond a ninety-two degree range due to internal features and each selectable setting is marked on the valve housing.

The valve has a hex head 100 that may be readily accessed with a wrench or socket to turn as desired. The regulator 92 moves in unison with the turning of the hex head 100. Likewise, either the spring-loaded detent ball 98 or the selectable settings 96 move in unison with the turning of the hex head 100 as well. Thus, turning of the hex head 100 is accomplished with a single tool, even when the valve is not easily visible. Preferably, the valves are color coded for both bump (compression) and rebound (extension).

The check valve piston 102 has a contoured face that seats against a machined tapered surface and provides smooth, uninhibited flow of the hydraulic oil. All of the edges of the piston are rounded, thereby reducing cavitation as the oil flows past them. A linear coil spring 104 assists in returning the piston to its position against the sealing surface when flow changes direction. The pressure generated by the working piston governs how far the IFMV must travel to permit the flow of oil to bypass it without restriction. Bleed ports 106 are provided in the piston head to allow oil to flow out of the cavity between the internal bore of the IFMV piston 108 and the guide pin 110, preventing hydraulic lock. This in turn allows the piston to reciprocate quickly and without delay.

Figure 25:
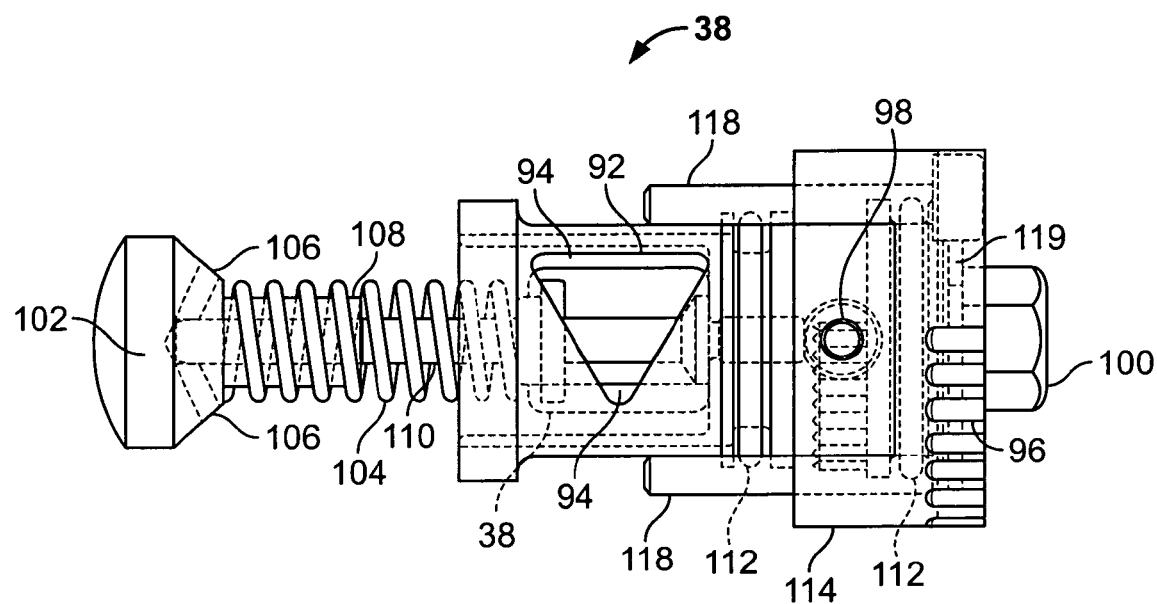
FIG. 25 is a side view of the IFMV of FIG. 23 but with portions shown transparent that otherwise block portions underneath from view.
Figure 26:
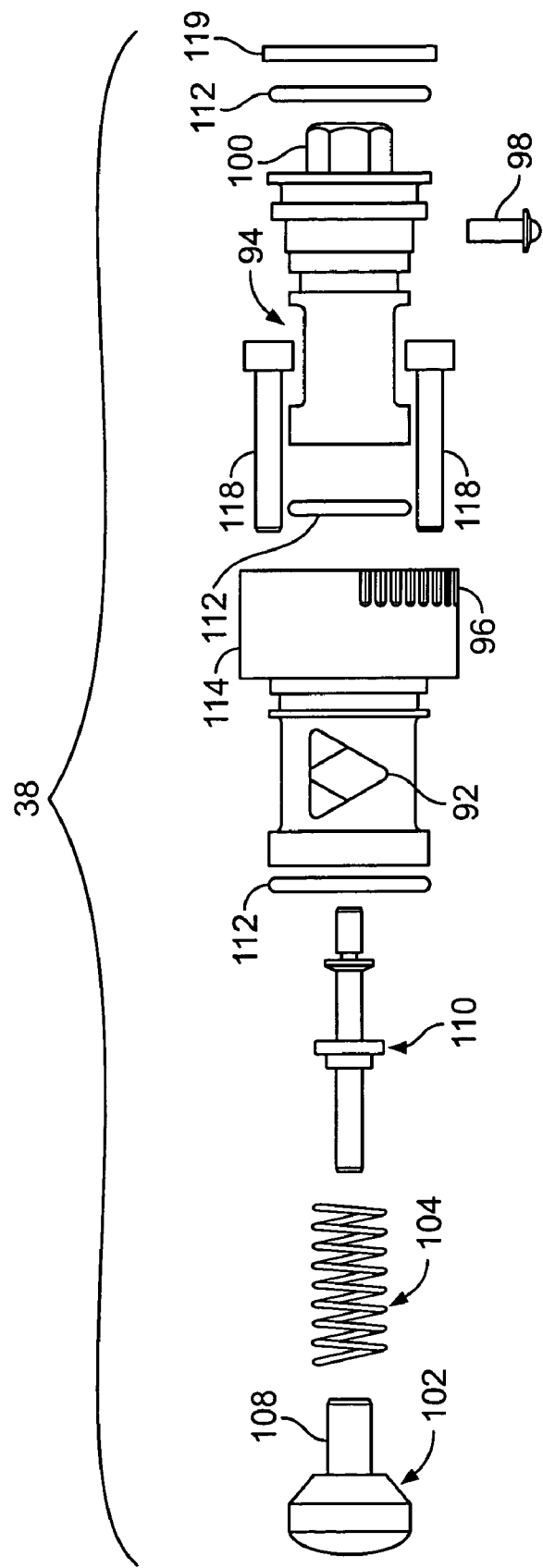
FIG. 26 is an exploded view of the components of the IFMV of FIG. 25.

Also shown in FIGS. 25 and 26 are O-rings 112, the valve housing 114, and the socket head cap screw 118 used to secure the IFMV into a pair of receiving screw holes 116 at the end of the longitudinal auxiliary holes 30 (FIG. 5), and a ring 119.

Each radial bypass damper has four IFMV assemblies, two for bump (compression) and two for rebound (extension). The position of the assembly is dependent on the travel length of the radial bypass damper.

Figure 27:
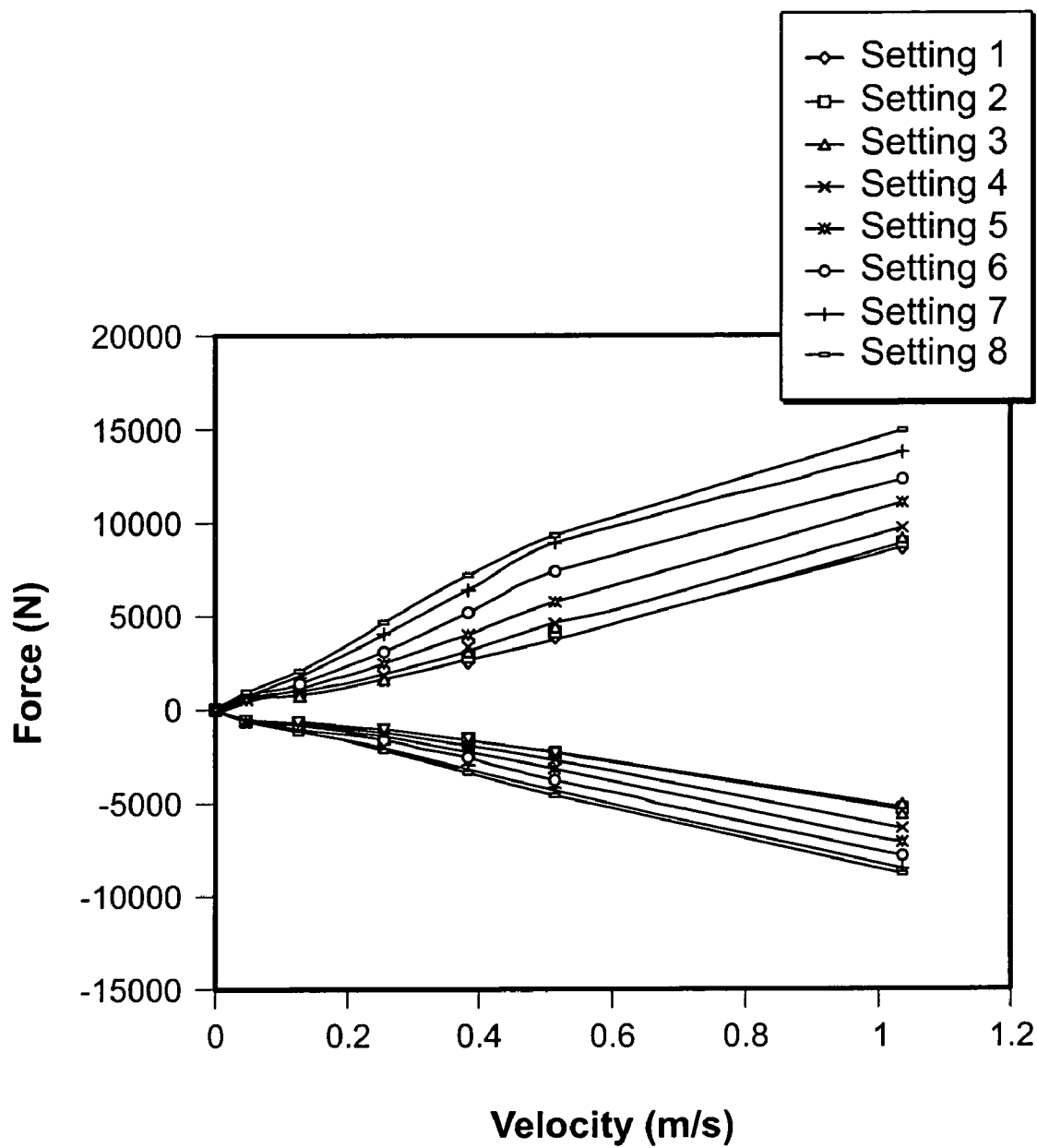
FIG. 27 is a graph of the force/velocity change at each of the settings of the IFMV of FIG. 23.

Each setting of the IFMV 38 changes the force/velocity, either positively or negatively, in a linear fashion. FIG. 27 shows a graph of the force/velocity change, which is indicative of the separation achieved with each setting on the rebound/bump stroke of the shock absorber.

While the foregoing description and drawings represent the preferred embodiments of the present invention, it will be understood that various changes and modifications may be made without departing from the scope of the present invention.

What is claimed is:

1. An apparatus useful to regulate internal pressures in a shock absorber, said shock absorber comprising a fluid-containing cylinder and a working piston capable of moving back and forth within the cylinder in response to external forces, said apparatus comprising:
   a reservoir for receiving fluid from said cylinder upon being connected thereto;
   an anti-cavitation valve adapted to reduce fluid cavitation when said reservoir is connected to said cylinder, said fluid cavitation being caused by the movement of the working piston, and said anti-cavitation valve including:

a valve body fixedly positioned within said reservoir, said valve body having opposite faces and a plurality of converging passageways that incline in a converging direction from one of the opposite faces to the other and a plurality of diverging passageways that incline in a diverging direction from the one of the opposite faces to the other, the converging and diverging passageways being separated from each other, and valving shims extending over said plurality of converging passageways and said plurality of diverging passageways, each of said valving shims being associated with either said converging passageways or said diverging passageways, each of said valving shims being movable with respect to the valve body in response to pressure within the reservoir, the anti-cavitation valve maintaining pressure between the working piston and the reservoir when the working piston transitions from one direction to another.

2. The apparatus of claim 1 wherein the valve body has circumferential outer walls that are fixedly attached to circumferential walls of a cavity in the reservoir.

3. The apparatus of claim 1 wherein the valving shims include a plurality of plates that are stacked in succession and extend outwardly from the valve body.

4. The apparatus of claim 3 wherein the plurality of plates are of different dimensions.

5. The apparatus of claim 1 wherein the plurality of converging passageways equals a first number of such passageways and wherein the plurality of diverging passageways equals a second number of such passageways, said first and second numbers being different.

6. The apparatus of claim 1 wherein said valving shims include a first number of shims that serve to open and close the converging passageways and a second number of shims that serve to open and close the diverging passageways, said first and second numbers being different.

7. The apparatus of claim 1 wherein the anti-cavitation valve responds to a certain level of pressure within the reservoir while maintaining a positive pressure on the working piston when it transitions from one direction to another.

8. The apparatus of claim 7 wherein the reservoir further includes a gas chamber that responds to pressures within the reservoir above the certain level while maintaining a positive pressure on the working piston as it transitions from one direction to another.

9. The apparatus of claim 8 wherein the anti-cavitation valve is configured to restrict fluid flow in the direction of the gas chamber so as to reduce a pressure buildup in the gas chamber.

10. An apparatus comprising
a shock absorber having a fluid containing cylinder and a working piston disposed in the cylinder capable of moving back and forth in response to external forces;
a reservoir coupled to the shock absorber for receiving the fluid in a first chamber thereof, said reservoir further including a gas-filled second chamber and a floating piston separating the first and second chambers; and
an anti-cavitation valve having a valve body fixedly attached to said remote reservoir between the working piston and he floating pistol and valving shims that move with respect to the valve body to open fluid coupling passageways extending though the valve body in response to pressure created by movement of the working piston, the anti-cavitation valve decreasing the pressure created within the second chamber by movement of the working piston and the anti-cavitation valve and second chamber serving to reduce fluid cavitation caused by movement of the working piston, the anti-cavitation valve maintaining pressure between the working piston and the reservoir when the working piston is in transition between a compression stroke and a rebound stroke.

11. The fluid flow regulator of claim 10 wherein the valve body has circumferential outer walls and said first chamber has circumferential inner walls and said outer walls are fixedly attached to said inner walls.

12. The fluid flow regulator of claim 10 wherein the valve body has opposite faces and a plurality of converging passageways that incline in a converging direction from one of the opposite faces to the other and a plurality of diverging passageways that incline in a diverging direction from the one of the opposite faces to the other, the converging and diverging passageways being separated from each other.

13. The fluid flow regulator of claim 10 wherein the valving shims include a plurality of plates that are stacked in succession and extend outwardly from the valve body.

14. The fluid flow regulator of claim 13 wherein the plurality of plates are of different dimensions.

15. The apparatus of claim 12 wherein the plurality of converging passageways equals a first number of such passageways and wherein the plurality of diverging passageways equals a second number of such passageways, said first and second numbers being different.

16. The apparatus of claim 12 wherein said valving shims include of first number of valving shims that serve to open and close the converging passageways and a second number of valving shims that open and close the diverging passageways, the first and second numbers being different.

* * * * *